United States Patent

[11] 3,581,775

| [72] | Inventor | John H. Dahl |
| | | Streamwood, Ill. |
| [21] | Appl. No. | 811,295 |
| [22] | Filed | Mar. 28, 1969 |
| [45] | Patented | June 1, 1971 |
| [73] | Assignee | Flex-Weld, Inc. |
| | | Bartlett, Ill. |

[54] FLEXIBLE CONDUIT FOR USE WITH BASIC OXYGEN FURNACES
3 Claims, 2 Drawing Figs.

[52] U.S. Cl. .................................................. 138/104, 138/148, 138/134
[51] Int. Cl. .................................................. F16l 55/00
[50] Field of Search .................................... 138/103, 104, 109, 101, 120, 134, 148

[56] References Cited
UNITED STATES PATENTS

| 592,017 | 10/1897 | McCauley et al. | 138/109X |
| 1,367,246 | 2/1921 | Ewald | 138/134 |
| 1,756,698 | 4/1930 | Oden | 138/109 |
| 2,085,441 | 6/1937 | Murray | 138/101 |
| 2,690,806 | 10/1954 | Britton | 138/148X |
| 3,459,229 | 8/1969 | Craft | 138/109X |

FOREIGN PATENTS

| 557,575 | 11/1943 | Great Britain | 138/148 |
| 964,164 | 7/1964 | Great Britain | 138/109 |
| 984,643 | 3/1965 | Great Britain | 138/109 |
| 1,007,859 | 10/1965 | Great Britain | 138/109 |

*Primary Examiner*—Herbert F. Ross
*Attorney*—Robert E. Wagner

ABSTRACT: A flexible metal fluid transmission conduit for handling high-velocity and pressurized fluids formed by a flexible inner liner and flexible, leakproof outer line protected by a braided cover. Means is provided to maintain the inner line spaced from the outer line. Means is also provided to indicate failure of the inner line. The inner line is secured at its ends to the outer line through a clamping arrangement which permits removal and replacement of the flexible inner line. The outer lines may come in two sections, while the inner line is continuous.

PATENTED JUN 1 1971
3,581,775
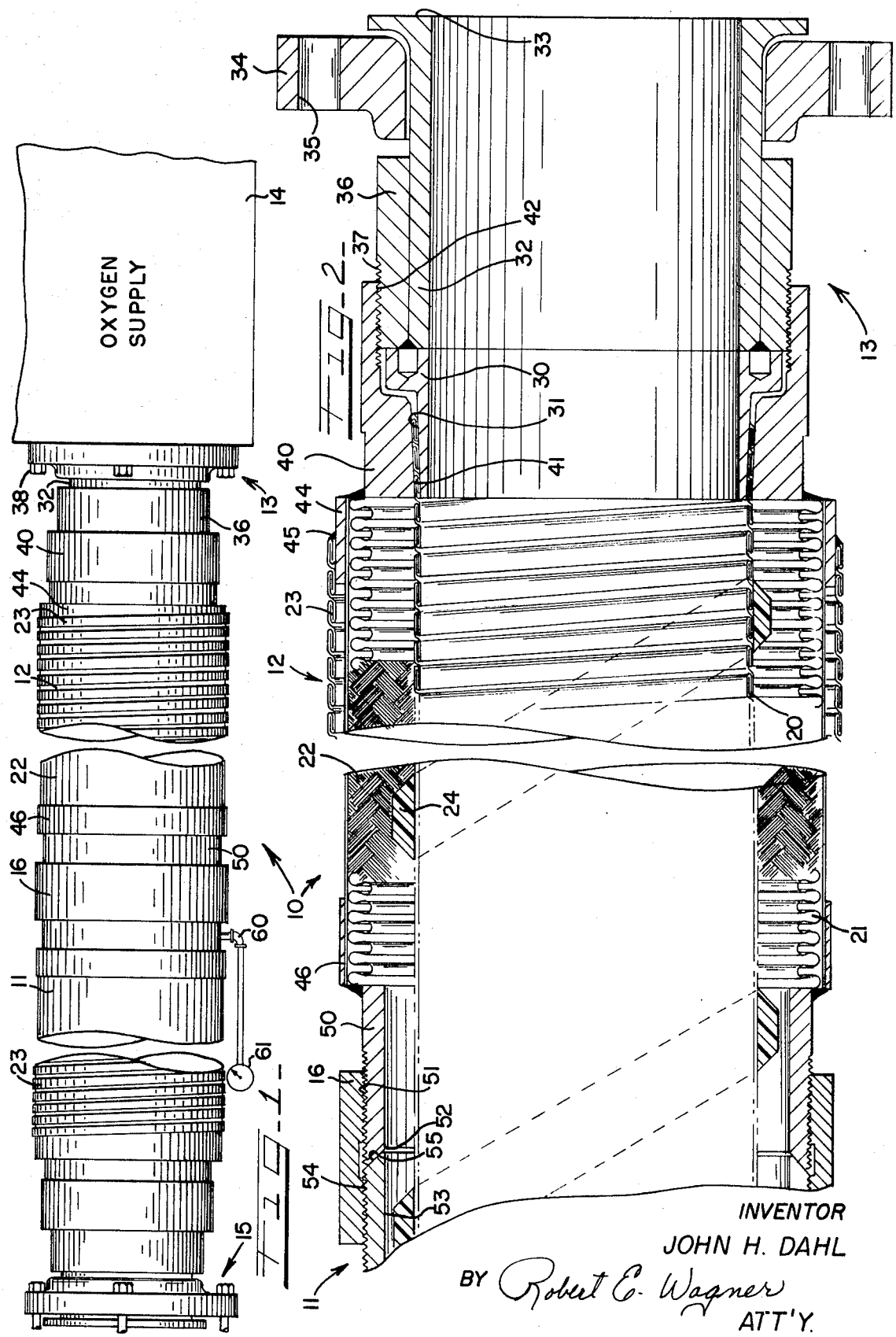
INVENTOR
JOHN H. DAHL
BY Robert E. Wagner
ATT'Y.

FLEXIBLE CONDUIT FOR USE WITH BASIC OXYGEN FURNACES

This invention relates to fluid handling means in general and, more specifically, is directed to an improved flexible conduit or hose assembly particularly adapted for handling high-velocity pressurized fluid which, if unconfined, would be extremely hazardous.

Basic oxygen furnaces have received increasing acceptance by the steel making industry as a whole. In brief, oxygen is fed into the molten metal at a very high rate of velocity to expedite the steel-making process and from a product having greater purity. It has been said that the product is better and the process is 10 times as fast as open hearth methods. In the present design of oxygen furnace, the oxygen supply is maintained at some distance from the furnace and the oxygen is fed through the hose or conduit into the oxygen furnace through an oxygen lance or the like. As can be expected, a tremendous differential temperature is experienced from one end of the hose to the other and also the differential pressure between the interior of the hose, when compared with the ambient. Flexibility of the hose under these conditions is a must. The hazards of oxygen are well known and need not be discussed other than to point out that it is extremely important from the standpoint of safety, that it be confined at all times. All possibilities of accidental release must be prevented.

In the presently used hose design, the inner core is manufactured from heavy strip which is positioned in an interlocked hose and covered with asbestos or canvas cloth and the other layer covered with a resilient material such as rubber. The outer covering is visually inspected periodically as is the inner core to determine whether replacement is required. As can be expected, because of the environment in which the hose is used, it is exposed to all forms of abuse and must be capable of withstanding such abuse without failure. When either the inner core or outer layer of the hose become worn in the normal course of use, it was replaced to avoid any possibility of failure because of the hazards it presented. One of the disadvantages encountered in the use of such hose is the expensive construction as well as the excessive weight. Wearing qualities of the hose did not meet expectations.

The present invention proposes a unique solution to the problem outlined above. A novel flexible fluid transmission conduit assembly is provided consisting of a relatively light interlocked liner hose of fluid line which is located within a flexible impervious intermediate conduit. Guards are provided at opposite ends so as to retard possible damage in installation of the line. Because of the abrasive qualities of pressurized high-velocity and low temperature fluid, the inner conduit is subject to considerable wear. A novel clamping arrangement is provided at opposite ends of the hose to facilitate easy replacement of the inner liner. Means may be provided to indicate when the inner liner or transmission core has failed, permitting it to be promptly replaced without causing a hazard. Because of its interlocked construction, replacement is relatively inexpensive, as it is well known that interlocked hose is inexpensive to manufacture. For the intended use as a transmission core, it is satisfactory because the auxiliary protective features are provided by the outer line cooperating to form the entire flexible fluid transmission assembly. The means which supports the ends of the inner flexible line also functions to seal the ends against oxygen leakage. In applications where the overall flexible conduit assembly is of substantial length, the outer line may be formed in two parts for ease in shipping, installation and replacement of the inner fluid transmission liner.

It is an object of this invention to provide a new and improved fluid transmission conduit assembly particularly adapted for transmitting high-velocity and pressurized fluids from a supply to a furnace or the like.

It is a further object of this invention to provide a new and improved conduit assembly having a light-duty interlocked transmission core encased in an outer, fluid impervious flexible line which in turn, is shielded by an outer braided line.

It is a still further object of this invention to provide a new and improved fluid transmission conduit assembly having means to indicate failure of the transmission core.

It is a further object of this invention to provide a new and improved fluid transmission conduit assembly composed of concentric flexible lines wherein the inner transmission core is readily removable and replaceable.

It is a still further object of this invention to provide a new and improved flexible conduit fluid transmission assembly having means to maintain the fluid transmission liner in spaced relation to an outer line.

Objects other than those specifically set forth will become apparent to the man skilled in the art after consideration of the accompanying drawings and following description:

IN THE DRAWINGS

FIG. 1 is an elevational view of the two-part hose assembly of the present invention with the central portion of the flexible transmission conduit broken away; and FIG. 2 is an enlarged cross section of the basic flexible conduit construction illustrating the novel attachment means at opposite ends.

Referring now to FIG. 1, the flexible transmission conduit assembly of the present invention is indicated generally by the reference numeral 10 and is formed of two sections 11 and 12. The sections are of identical design with the exception of the hand of the threads of their adjacent ends and, therefore, description will be limited basically to the right-hand section 12. The section 12 is provided with an attachment means indicated generally at 13 which joins the conduit to an oxygen supply indicated at 14. The section 11 is joined by a similar attachment means 15 to an oxygen lance or similar means used in a basic oxygen furnace (not shown). The sections 11 and 12 have the inner ends in abutting engagement and held in place by an assembly sleeve 16 having internal threads of opposite hand.

The detailed construction of the transmission conduit section 12 is seen in the cross-sectional view of FIG. 2 including an inner transmission core on line 20 which is formed of stainless steel, helically wound and interlocked in the manner indicated. The basic interlocked construction and method of forming an interlocked flexible conduit of their type is well known in the art and, therefore, detailed description will be withheld in the interest of brevity.

A corrugated annular line 21 is located in circumferentially spaced relation to the line 20 forming an outer line. The corrugated line 21 is protected and contained along its outer surface by a braided metal shield 22. Protection is provided by an outer line 23 overlying the braided covering for a few feet at each end. This may be formed of stainless steel, helically wound flexible tubing and which is designed to assure maximum protection against abrasion and other forms of mechanical damage to the assembly. Basically, the outer conduit 23 is intended primarily to provide a guard for the braided cover and stainless steel corrugated outer line 21 during handling and installation.

The inner liner or transmission core 20 is maintained in spaced relation to the outer line 21 by means of a helically wrapped spacer 24 which maintains the inner line 20 properly located radially relative to the radially spaced adjacent line 21. The spacer may be formed of any suitable material such as elastomers, plastics or any other material which will retain its resiliency and withstand deterioration under operating conditions.

The inner liner or transmission core 20 is continuous and extends from the attachment means 13 to the attaching portion 15 without interruption. It is jointed at the attaching portion through a novel clamping arrangement formed by an inner clamping ring 30 having a frustoconical wedging surface 31 formed at one end. The opposite end is joined to a stub end 32 having a lapped face 33 adapted for sealing engagement to the oxygen supply. A flange ring 34 is formed with bolt openings 35 to accommodate bolts 38 shown in FIG. 1, the latter providing clamping force. The clamping ring 30 is wedged with a sleeve 36 having fine threads 37 formed at one end. An outer adapter 40 is provided with a complementary shaped internal frustoconical surface 41 which cooperates with the surface 31 to clamp the end of the transmission core to the stub end 32 in a fluidtight manner. Complementary fine internal threads are formed at 42 to cooperate with the threads 37 to draw the cooperating frustoconical surfaces 31 and 41 into engagement with the inner and outer circumferential portion of the end of the transmission line 20. The opposite end of the transmission line is held in an identical manner and, therefore, in the interest of brevity, specific description will be omitted.

The adapter 40 is joined to a collar 44 which may be formed of stainless steel with the collar 44, corrugated hose 21 and braid 22, all being joined to the adapter ring 40 by welding. This forms a fluidtight and rigid mechanical joint. The guard 23 is positioned over the collar 44 with one end extending a few feet down the hose while the opposite end is joined by a weld 45. A similar joint construction is provided at the opposite end of the section 11. In the center joint, a collar is joined to a connecting ring or adapter 50 which is externally threaded as at 51. The end of the adapter 50 is frustoconical or tapered as at 52 to receive a complementary shaped portion on a corresponding adapter 53 which is provided with fine threads 54 of a hand opposite that of the threads 51. The assembly sleeve or ring 16 is provided with complementary shaped threads to permit the tapered surfaces 52 and 55 to be drawn into abutting engagement to from a rigid mechanical and fluidtight joint. The tapered surfaces 52 and 55 may be polished to the desired surface finish to provide good sealing when brought into abutting engagement.

In preferred from of transmission conduit, all the elements are formed from stainless steel with all of the permanent joints being welded in an inert atmosphere for maximum strength and sealing ability. As can be appreciated, the interlocked hose forming the liner or inner core 20 is relatively inexpensive to manufacture. It functions to take the wear occurring through the abrasion on the walls by the fast flowing fluid. The outer line 21 acts as a pressure vessel and will positively prevent any fluid loss. The outer guard 23 extends a few feet from each end and protects the outer circumference of the corrugated line 21 from mechanical damage during handling and installation.

As is well known in the art, the oxygen supplied through the transmission core 20 travels at extremely high velocity and is under considerable pressure. Any pressure loss through the inner liner or transmission core 20 may cause a slight buildup in the space between the inner line 20 and outer line 21 to provide an intermediate pressure zone. The passage of the oxygen through the inner core 20 has an abrading effect on the inner walls of the core 20 and necessitates replacement after a prolonged period of use. With the novel clamping and adapter arrangement of the present invention, only the inner or transmission core 20 needs to be replaced. The remaining part of the transmission conduit 10 consisting of the corrugated hose and braided cover may continue to be used until it will no longer function as a pressure vessel. Because of the two section arrangement, the inner transmission core 20 is readily replaced and is easily installed in original installations.

As an indication of the condition of the transmission core 20, a venting means 60 may be provided which communicates with the space between the transmission core and outer core 21. This may be connected to a pressure guage, alarm or the like, indicated generally at 61, and serves to indicate the inner liner or core condition. In the event the transmission core wears to the point where considerable leakage occurs, the pressure buildup will be readily observable on the guage 61. As a suitable alternative, the guage 61 may be replaced by a pressure responsive switch which operates to cut off flow of oxygen automatically should failure of the transmission core 20 occur. Because of the novel manner in which the transmission core is mounted, it may be quickly and easily replaced to minimize the downtime of the furnace.

Upon a consideration of the foregoing, it will become obvious to those skilled in the art that various modifications may be made without departing from the invention embodied herein. Therefore, only such limitation should be imposed as are indicated by the spirit and scope of the appended claims.

I claim:

1. A flexible fluid transmission conduit assembly particularly adapted to conduct fluid at high pressure and velocities, said flexible conduit comprising an inner fluid impervious flexible transmission line formed of interlocked spirally wound metal, an outer flexible fluid impervious transmission line, means joining said fluid impervious outer and inner lines at the ends thereof to hold each in radially spaced relation to the other at said ends to thereby form a closed chamber between said inner and outer lines, said means removably joining said inner and outer lines including a clamping ring having a frustoconical clamping surface thereon, a second clamping ring having a complementary shaped clamping surface thereon for positioning over said surface and means to draw said frustoconical surfaces into fluidtight engagement with opposite sides of said inner transmission line, said outer line being formed of continuous corrugated metal having a braided-type covering over the outer circumference to protect the same, and means to maintain said lines spaced intermediate said ends.

2. The flexible transmission conduit of claim 1 including sensing means communicating with said closed chamber between said outer and inner line responsive to a substantial change in pressure therein to indicate failure of said inner transmission line.

3. The flexible conduit assembly of claim 1 wherein said outer line is formed in two separable sections and said inner transmission core is in one continuous section to facilitate replacement of the portion exposed to wear by fluid passage.